(12) United States Patent
Wilson et al.

(10) Patent No.: US 8,635,717 B2
(45) Date of Patent: Jan. 28, 2014

(54) PROGRAMMABLE AUTOMATIC FLUSHOMETER

(75) Inventors: John R. Wilson, Naperville, IL (US); Xu Wang, Vernon Hills, IL (US)

(73) Assignee: Sloan Valve Company, Franklin Park, IL (US)

( * ) Notice: Subject to any disclaimer, the term of this patent is extended or adjusted under 35 U.S.C. 154(b) by 118 days.

(21) Appl. No.: 13/242,513

(22) Filed: Sep. 23, 2011

(65) Prior Publication Data

US 2012/0011644 A1  Jan. 19, 2012

Related U.S. Application Data

(62) Division of application No. 11/871,886, filed on Oct. 12, 2007, now Pat. No. 8,037,551.

(60) Provisional application No. 60/851,790, filed on Oct. 13, 2006.

(51) Int. Cl.
  *E03D 1/00* (2006.01)
(52) U.S. Cl.
  USPC .............................. 4/313; 137/1; 251/129.04
(58) Field of Classification Search
  USPC .............................. 251/129.04; 137/1; 4/313
  See application file for complete search history.

(56) References Cited

U.S. PATENT DOCUMENTS

| | | | |
|---|---|---|---|
| 4,971,094 A | 11/1990 | Gonzalez | |
| 5,187,818 A | 2/1993 | Barrett, Sr. et al. | |
| 5,217,035 A * | 6/1993 | Van Marcke | 4/623 |
| 5,603,127 A | 2/1997 | Veal | |
| 5,915,417 A | 6/1999 | Diaz et al. | |
| 6,250,601 B1 | 6/2001 | Kolar et al. | |
| 6,499,152 B2 | 12/2002 | Johnson | |
| 6,560,790 B2 | 5/2003 | Saar et al. | |
| 6,757,919 B2 | 7/2004 | Snyder | |
| 6,978,490 B2 | 12/2005 | Wilson | |
| 7,549,436 B2 | 6/2009 | Parsons et al. | |
| 2004/0232370 A1 | 11/2004 | Parsons et al. | |
| 2005/0114992 A1 | 6/2005 | Todoroki et al. | |
| 2005/0199841 A1 | 9/2005 | O'Maley et al. | |
| 2005/0199843 A1 * | 9/2005 | Jost et al. | 251/129.04 |
| 2006/0005312 A1 | 1/2006 | Reddy et al. | |
| 2006/0289819 A1 * | 12/2006 | Parsons et al. | 251/129.04 |
| 2007/0151008 A1 | 7/2007 | Hayashi et al. | |

FOREIGN PATENT DOCUMENTS

| | | |
|---|---|---|
| EP | 0 331 461 | 9/1989 |
| GB | 2 358 413 A | 7/2001 |
| GB | 2 392 454 A | 3/2004 |
| WO | WO 01/73228 A1 | 10/2001 |
| WO | WO 2005/012659 A1 | 2/2005 |

OTHER PUBLICATIONS

International Preliminary Report on Patentability for PCT/US2007/079788, filed Sep. 27, 2007, document mailed Jan. 29, 2009.

(Continued)

*Primary Examiner* — John Bastianelli
(74) *Attorney, Agent, or Firm* — Foley & Lardner LLP

(57) ABSTRACT

Methods for communicating with an automatic flush valve device. The automatic flush device having a variety of operational modes which can be selected from to control the operation of the device. The communication from the automatic flush device providing a user with information regarding the status of the flush valve device.

9 Claims, 14 Drawing Sheets

(56) References Cited

OTHER PUBLICATIONS

Written Opinion of the International Searching Authority and International Search Report for PCT/US2007/079788, filed Sep. 27, 2007, documents mailed Feb. 7, 2008.

First Office Action for Canadian Patent Application No. 2,667,084, issued Dec. 23, 2010.
First Office Action for Chinese Patent Application No. 200780044570.9, issued Jun. 23, 2010.
Response to First Office Action for Chinese Patent Application No. 200780044570.9, filed Oct. 22, 2010.

* cited by examiner

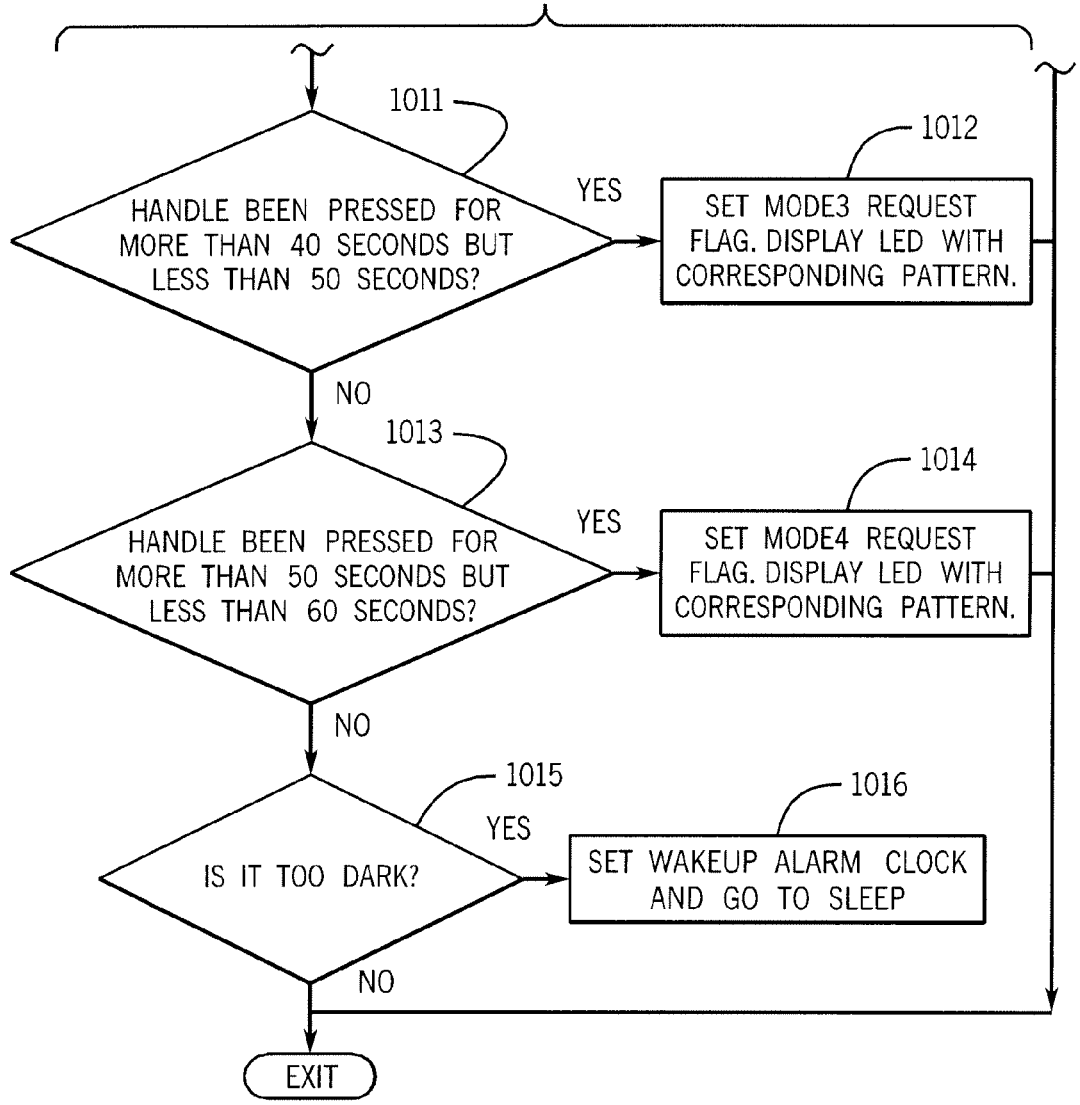

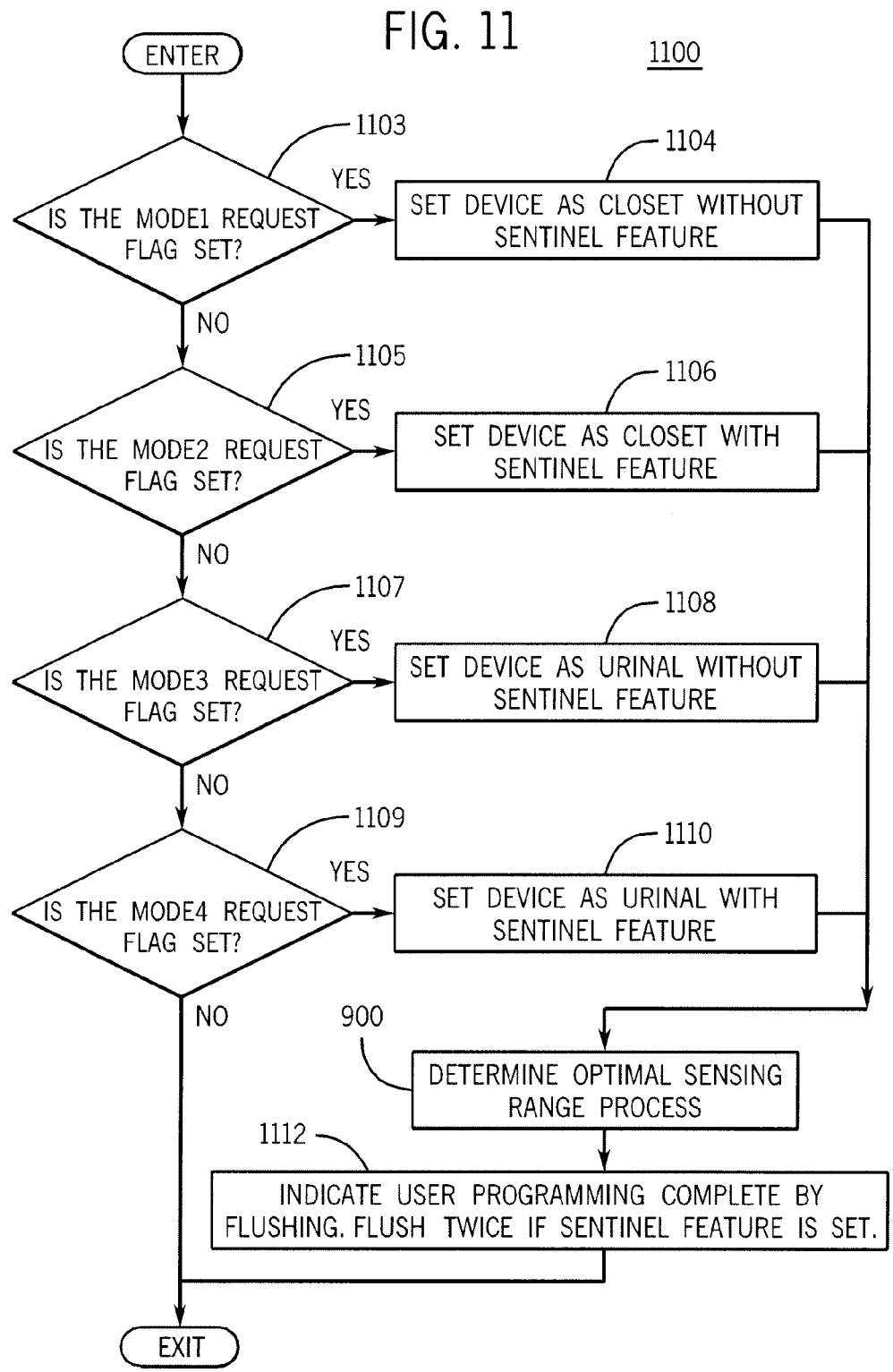

PROGRAMMABLE AUTOMATIC FLUSHOMETER

CROSS REFERENCE TO RELATED APPLICATIONS

This application is a divisional of U.S. patent application Ser. No. 11/871,886, filed Oct. 12, 2007. Claims priority from U.S. Provisional Patent Application No. 60/851,790, filed Oct. 13, 2006, herein incorporated by reference in its entirety.

BACKGROUND OF THE INVENTION

It is known to use an automatic actuator with a flush valve. The use of automatic flush devices has become commonplace in most commercial restrooms. Automatic flush valves provide hygienic and water usage benefits over manual-only flush devices.

However, the use of automatic flush valves often present installation and maintenance issues. For example, unlike traditional toilet fixtures, an installer would need to be familiar with electronics to install many prior automatic flush devices. In addition, maintenance is typically performed by employees without specialized skills but the often complex electronics of current automatic flush valve devices requires specialized training or special maintenance personnel with the appropriate tools. Further, battery life, sensor aiming, and flexibility across multiple applications are other areas of concern with prior art automatic flush valve devices, as they typically are a "one size fits all" type of device.

The use of an automatic flush device has the added benefit that it can be designed to operate in a plurality of different modes. However, prior art automatic flush valve devices have not provided a simplistic method for programming the automatic flush valve device. Prior art automatic flush valve devices typically require manual removal of a portion of the automatic flush device and physical manipulation of components within the automatic flush valve device. In addition, due to the nature of the automatic flush valve device, particularly those relying on a battery power source, there is a need for the automatic flush device to provide an indication of its state, i.e. operable, inoperable, etc.

SUMMARY OF THE INVENTION

The present invention relates to systems and methods for an automatic flush valve device. In one embodiment, the present invention relates to methods for communicating with an automatic flush valve device. The device includes an indicator, such as a visual indicator, which provides information to a user. The device further includes at least one presence sensor and at least one manually actuated handle with which the device can receive input. In one exemplary embodiment, the operational mode of the automatic flush device is controllable through user input from the presence sensor and/or handle. A user is able to place the device in a programming state and select an operational mode for the device.

These and other objects, advantages, and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The accompanying drawings, which are incorporated in and constitute a part of the specification, illustrate embodiments of the invention and together with the description, serve to explain the principles of an embodiment of the invention.

FIGS. 10A and 10B illustrate a flow chart for one embodiment of a light illumination sensing and user programming process;

FIG. 11 illustrates a flow chart for one embodiment of a mode setting process;

DETAILED DESCRIPTION OF THE PREFERRED EMBODIMENTS

The present invention relates to a method and system for providing an automatic flush device that is capable of communicating with a user. The communication allows the user to "program" certain operational aspects, as further described herein. In one embodiment, the communication is one-way, with the user providing input to the device. In another embodiment, the communication may be two-way, i.e. the user and device are both able to send/receive. For example, user is able to provide a signal to the device and the device is able to communicate that it has received the user's signal. One of ordinary skill in the art will appreciate that the embodiments described herein are operable on a multitude of automatic flush valve devices, including but not limited to those which are "retro-fit" devices and those which consist of integrated components.

The present invention relates to systems and methods for programming and automatically operating a flush valve. The flush valve may be of any of the various types known in the art, including, but not limited to, a diaphragm type or a piston type. A diaphragm-type flush valve is shown in U.S. Pat. No. 5,967,182, the disclosure of which is herein incorporated by reference. The piston-type flush valve may be of the type shown in U.S. Pat. No. 5,881,993, the disclosure of which is also herein incorporated by reference. In addition, the automatic actuator may provide for both automatic and manual actuation, thus allowing a user to manually actuate a flush in lieu of or in addition to an automatically triggered flush. An automatic and manual actuator that may be used with the present invention is generally described in U.S. Pat. No. 6,978,490, the disclosure of which is herein incorporated by reference.

Figure 1:
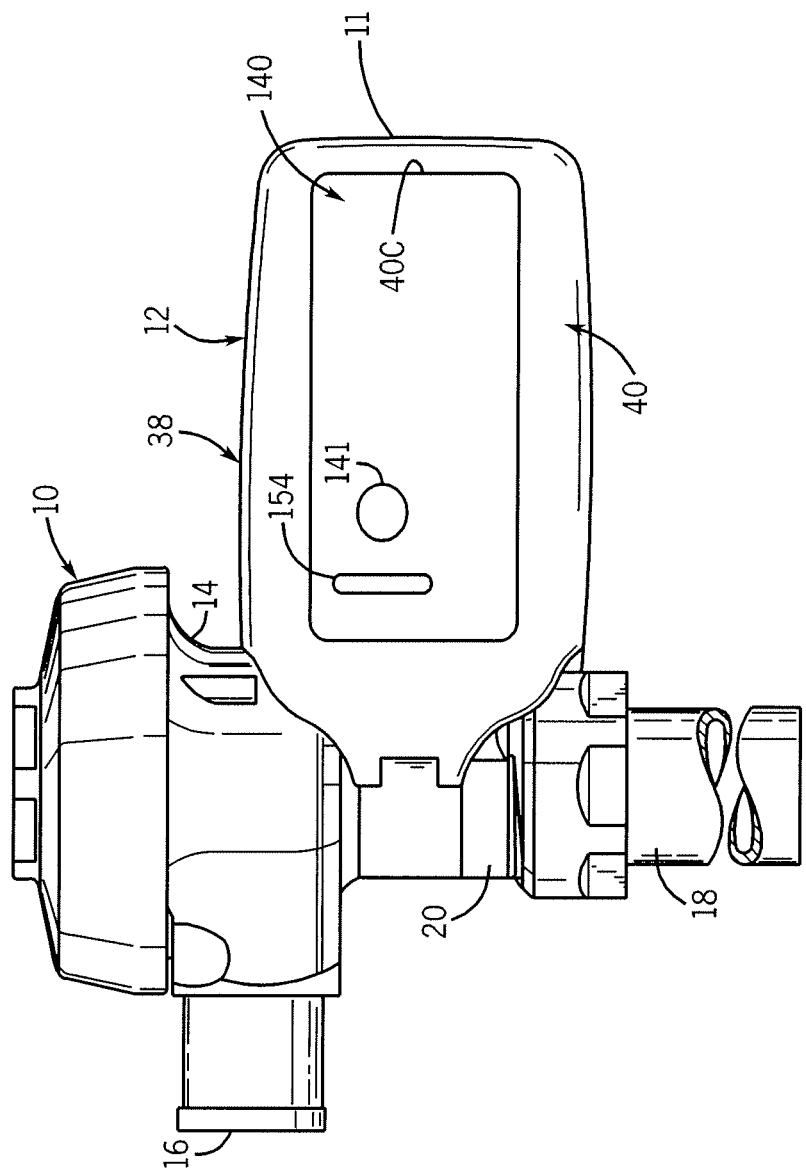
FIG. 1 is a front elevation view of a flush valve with the actuator for use with the present invention mounted thereon.
Figure 2:
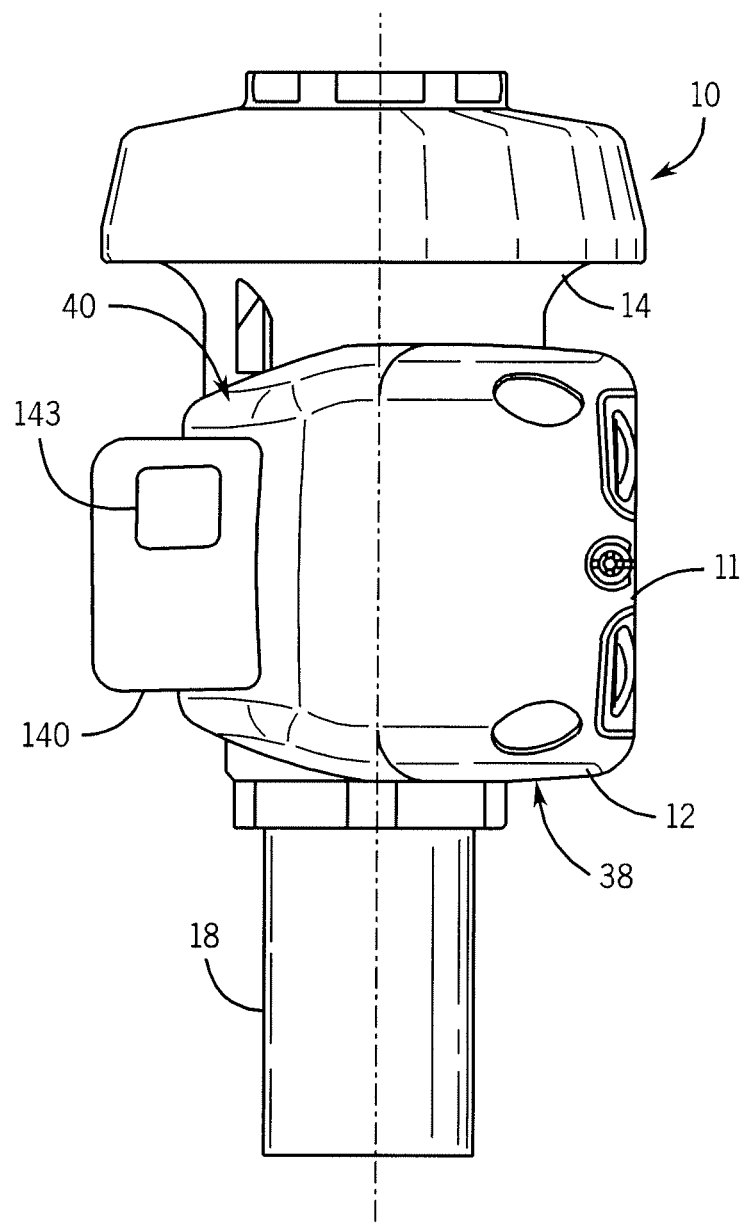
FIG. 2 is a right side elevation view of the actuator of FIG. 1 mounted on a flush valve.
Figure 3:
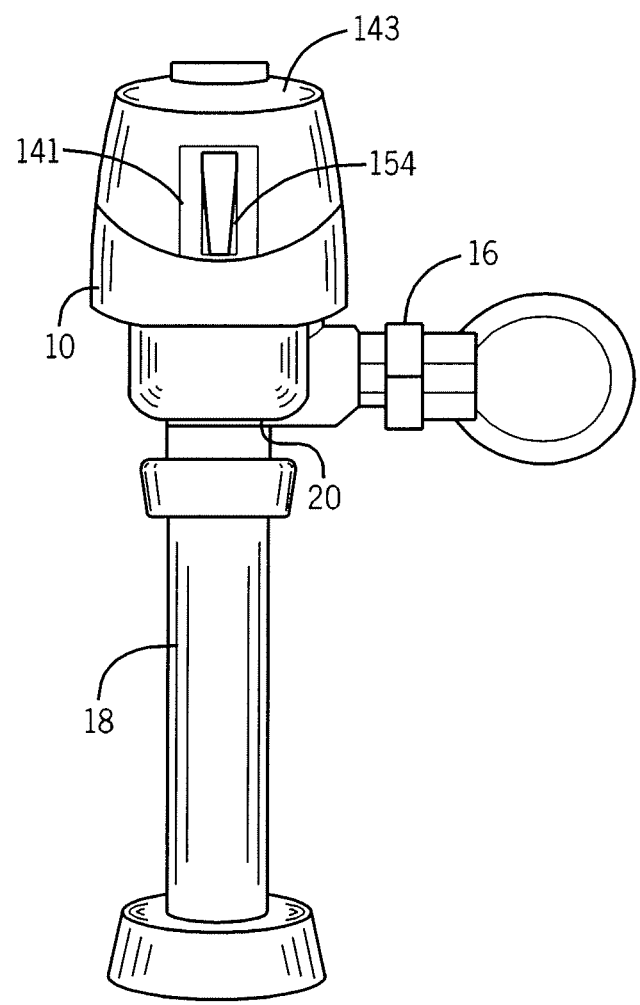
FIG. 3 is an illustration another embodiment of an automatic only flush device for use with the present invention.

FIGS. 1-2 illustrate one embodiment of an automatic flush device 11 allowing for manual or automatic actuation. FIG. 3 illustrates an alternative embodiment of the automatic flush device 11, where actuation is automatic only; no manual actuation handle 140 is provided. Referring generally to FIGS. 1 and 2, the automatic flush device 11 includes a flush valve 10, and mounted thereon is an actuator 12. The flush valve 10 has a body 14 which includes a water inlet 16, a water outlet 20 and a vacuum breaker 18 beneath the outlet. Inside the flush valve body 14 there is either a movable diaphragm or a piston (not shown) which will control the flow of water between the water inlet 16 and the water outlet 20 in the conventional manner. The diaphragm or piston (not shown) has associated with a relief valve (not shown) whose depending stem (not shown) extends to a point opposite the manual actuation mechanism 140.

The primary components of the actuator 12 include a housing 38 and a manual actuation handle 140. The manual actuation handle 140 is pivotally mounted in the housing 38. An interior portion of the manual actuation handle 140 resides within the housing 38 while an exterior portion extends through an opening in the front cover to the outside of the housing 38, and is engageable by a user.

The automatic flush device 11 includes a communication mechanism for providing information to an installer, a maintenance individual, a user, etc. The communication mechanism may include, but is not limited to, one or more visual indicators 141, one or more audio indicators, or combinations thereof. The communication mechanism may utilize typical components, such as the flush valve 10 itself, in an embodiment actuating the flush valve 10 provides a user with an audio (and visual) indication. In one exemplary embodiment, the communication mechanism comprises a visual indicator 141, such as, but not limited to, a Light Emitting Diode ("LED"). Preferably, the visual indicator 141 is positioned such that it can be observed from a position in front of the automatic flush device 11, such as the front of the housing 38 as illustrated in FIGS. 1 and 3, such as from a position of a maintenance person cleaning a water closet.

In one embodiment, the automatic flush device 11 includes a presence detector 154 for detecting the presence of a user. Such detection technologies include but are not limited to: active infra-red, capacitance detection, passive optical detection (e.g., a photo cell), and thermal detection such as passive infrared or thermopiles. Such presence detector 154 may be, but is not limited to, an infrared optical ("IR") sensor. The presence detector 154 may be as shown in U.S. Pat. No. 6,161,814, the disclosure of which is herein incorporated by reference. The presence detector 154 provides both an input for the automatic flush device 11 regarding the state of use of the automatic flush device 11 and allows a method of communication whereby a user can provide a signal to the automatic flush device 11, such as by placing his or her hand into the sensing zone.

During automatic operation of the automatic flush device 11, the presence detector 154 provides the automatic flush device 11 with information which triggers an automatic flush cycle, i.e., the flush valve 15 is triggered. For example, when a presence is detected for a certain predetermined time period, the actuator 12 initiates a flush without further input from the user, such as use of a manual handle actuator 140. Thus, when presence is no longer detected (i.e. the user has left the flush valve 10) the automatic flush device 11 will flush. Preferably, in one embodiment, this occurs after a predetermined time sufficient to allow a user to exit the vicinity of the automatic flush device 11. It will be appreciated by one of ordinary skill that a plethora of timing modes could be devised including modes specifically designed for certain applications such as urinals or water closets.

In one embodiment, the communication between the device and the user takes a plurality of forms. The time duration of the user presence in the sensing zone (not shown) of the pressure detector 154 is a user input to the automatic flush device 11. Various operational changes can be achieved using such an input system, and it should be appreciated that the time interval corresponding to a command need only be unique, not necessarily a specific time. For example, in one embodiment, a user stands (or places an object) in the sensing zone for more than 8 but less than 10 seconds is a command for the automatic flush device 11 to report its status. However, other time ranges or commands could be utilized.

Another form of communication in the present invention is the time duration the manual actuation handle 140 has been pressed, detected, in one embodiment, by the ambient light detector 143, as described below. For example, the manual actuation handle 140 having been pressed for more than 20 seconds may be command for the automatic flush device 11 to enter in programming state.

The automatic flush device 11 of the present invention may have several functional states and operational modes 409. A functional state describes the general state of the automatic flush device 11 and its current functionality. For example, the automatic flush device 11 may have an operational state 320, a sleep state 321, and a programming state 322. In contrast, operational modes 409 represent the specific operational characteristics which the automatic flush device 11 may exhibit and are described further herein.

Figure 12:
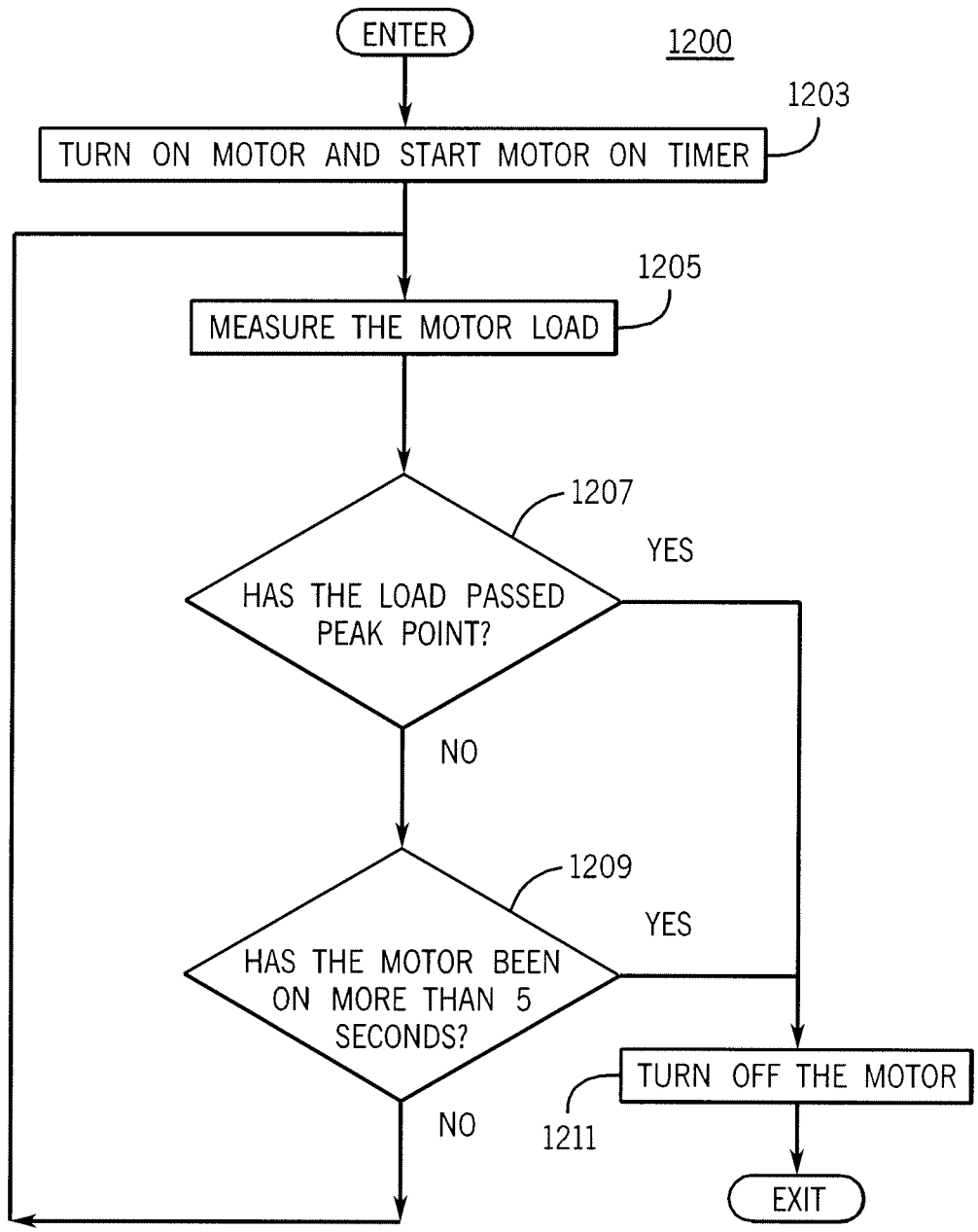
FIG. 12 illustrates a flow chart for one embodiment of a flush process.

In the operational state 320, the automatic flush device 11 functions "normally" i.e. the automatic and/or manual flush valve activation can occur, such as via IR sensing and the auto flush process 1200 (FIG. 12). In one embodiment, the automatic flush device 11 is programmable to operate in a predetermined manner by selection of a certain operational mode 409, such as for a water closet, a urinal, with or without an inactive flush feature. While in operational state 320, the automatic flush device 11 may exhibit any of the various characteristics of features one of ordinary skill in the art would appreciate or which are within the scope of the present invention. Operational modes 409 reflect specific settings of the automatic flush device 11 that are typically adapted for a specific situation or usage. For example, a automatic flush device 11 may have an operational mode 409 for a water closet wherein the time period for which a presence must be detected prior to the entry into the automatic flush cycle is relatively long. In contrast, an operational mode 409 for a urinal may have a time period which is relative short, reflecting the different usage patterns of those environments. Likewise, the depth of the sensing field may be made to be much shallower for an operational mode 409 designed for a water closet application to account for the presence of a door within a few feet of the automatic flush device 11. Inactive flush feature is a modification of normal operation wherein the flush valve is triggered when inactivity is detected for a certain period of time (such as every 24 hrs). This may be desirable to sweep the drain with water or to maintain a general state of freshness.

Sleep state 321 represents recognition of the automatic flush device 11 that its current environment indicates immediate future usage is not likely. In one embodiment, the automatic flush device 11 includes a sleep state 321 that represents a lower power requirement profile. It will be appreciated that such a state will reduce power consumption, for example prolonging the battery life for embodiments using battery power, and reduce maintenance of the automatic flush device 11. In one embodiment, the automatic flush device 11 may enter a sleep state 321 when the ambient light detector 143 detects no light for several minutes and the presence detector 154 detects nothing present in its range. In addition, as part of the sleep state 321, "shipping mode" may be provided for even greater reduced energy consumption prior to installation such as where the automatic flush device 11 enters sleep state 321 when the IR sensor detects an object in its field (i.e., the box or packaging) and the ambient light detector 143 detects no light.

In the programming state 322, the automatic flush device 11 is able to send/receive communications regarding the operational mode 409 and settings of the automatic flush device 11, such as those described regarding the above. Thus, it is possible, in accordance with the principles of the present invention, to modify the operation of the automatic flush device 11 without the use of physical tools. One of ordinary skill will appreciate that there are a multitude of operational modes 409 in which an automatic flush device 11 in accordance with the principles of the present invention may operate, for example, but not limited to, in a water closet or in a urinal setting.

In addition, the automatic flush device 11 may communication information to a user given a specific situation. For example, in one embodiment, the automatic flush device 11 proceeds through a series of visual indications. The user may "select" a mode of operation 409 by leaving the sensing zone, and/or pressing and/or releasing the device handle. Next, the automatic flush device 11 current status is encoded is tagged and stored in memory. Then the automatic flush device 11 selected status is indicated by the visual indicator 141. For example, the user releases the manual actuation handle 140 when the LED blinks at 4 times per second, a visual indication for urinal mode and to turn on inactive flush mode feature, thus selecting the indicated mode (urinal with inactive flush mode feature). The communication is bidirectional, once the automatic flush device 11 gets a signal from the user, it "echoes" back by a visual or audio indication to confirm with user what input the automatic flush device 11 has revived.

One of ordinary skill in the art will appreciate that typical IR sensors have a minimum and maximum effective range, i.e. a functional sensing field. As such, it is desirable to allow for an adjustable sensing field since the automatic flush device 11 may be employed in a wide array of settings (i.e. water closets, urinals, stadium facilities, etc). In one embodiment, the present invention comprises a programmable range for the presence detector 154. The presence detector 154 is assigned a predetermined absolute minimum and maximum value or max range set at slightly less than background detection. A user can trigger the automatic ranging of the presence detector 154, such as by activating the manual actuation handle 140 for a predetermined time.

In addition to a presence detector 154, the automatic flush device 11 may include additional sensors for providing environmental information to the automatic flush device 11. For example, the automatic flush device 11 may include a second sensor such as, but not limited to, an ambient light detector 143. The ambient light detector 143 detects the level of light in the environment around the automatic flush device 11, which can provide an indication of both current usage and likely future usage. The ambient light detector 143 may, in an exemplary embodiment, provide an indication for the automatic flush device 11 to switch modes, such as from operational state 320 when the environment is lit to a sleep state 321 when no light has been detected for a certain period of time. In addition, information from the ambient light detector 143 and the presence detector 154 finder may be used in combination to control the mode of the device. For example, where the presence detector 154 detects a constant object and the ambient light detector 143 detects little or no light, the automatic flush device 11 may enter a pre-installation state similar to the sheep state 321 recognizing that it is likely located in its packaging for sale and thus providing for a lower power consumption profile.

In an exemplary embodiment shown in FIG. 1, the ambient light detector 143 is positioned in communication with the manual actuation handle 140 to determine when the manual actuation handle 140 has been pressed. The portion of the manual actuation handle 140 having the ambient light detector 143 is partially disposable into the housing 38, when depressed, thus blocking ambient light from reaching the detector 143. Therefore, the ambient light detector 143 may be used to indicate activation of the manual actuation handle 140.

For embodiments having both automatic and manual flush abilities, it will be appreciated that it may be desirable to prevent a "double flush" that may occur if an automatic flush cycle has been started but the user manually flushes the automatic flush device 11. Thus, in one exemplary embodiment, when the manual actuation handle 140 has been triggered, the automatic flush cycle is exited prior to completion, thus avoiding a potential "double flush" due to a manual actuation during an automatic flush cycle. This embodiment provides for increased water efficiency by avoiding a double flush.

Figure 4:
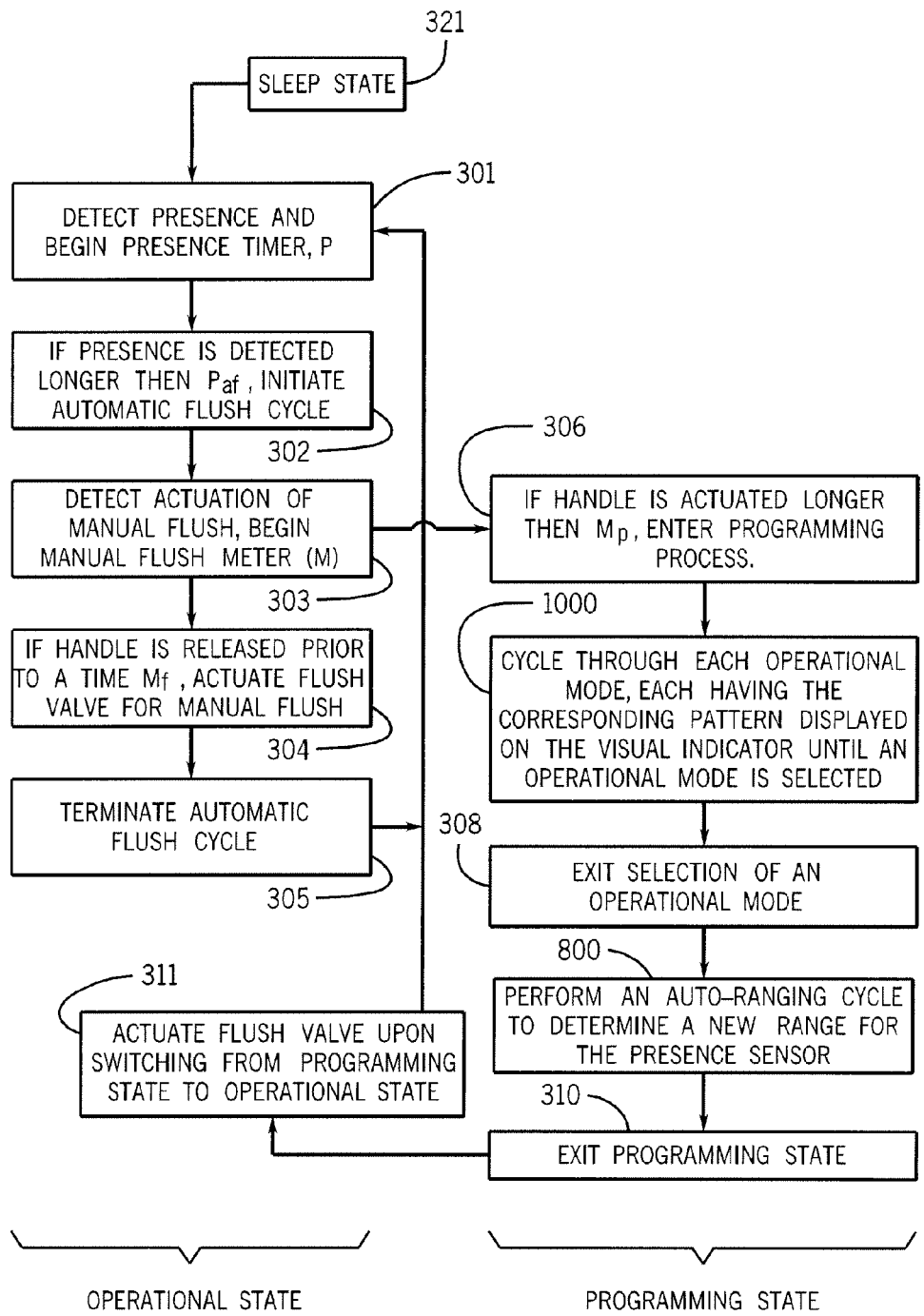
FIG. 4 is an illustration of one method for programming the flush device.

FIG. 4 illustrates one example embodiment of the present invention. The automatic flush device 11 detects the presence of a user at 301 and a presence timer is begun until a presence is no longer detected. If the presence is detected for longer than time "$P_{af}$" (typically the time determined to indicate the presence of someone using the facilities, for example 15 seconds), an automatic flush cycle is initiated at 302 to be completed when the presence is no longer detected, or, in one embodiment, after a predetermined period of time following a detection state change from present to not present so as to allow a user to leave the vicinity of the automatic flush device 11.

The automatic flush device 11 also monitors, at 303, for the actuation of the manual actuation handle 140 and, upon detection, begins a manual flush timer until actuation of the manual actuation handle 140 is no longer detected. If the manual actuation 140 handle is released prior and the timer M is less then a predetermined manual flush time "$M_f$" (the time determined to represent a desire for actuating a manual flush by a normal user, for example 10 seconds), then the flush valve 10 is actuated and a flushing of the automatic flush device 11 occurs at 304. At 305, if the automatic flush device 11 has an automatic flush cycle running, the cycle is terminated. If the manual flush timer runs (i.e. the user is actuating the handle) 140 for at least a time "$M_p$" (typically a time greater than $M_f$, for example 15 seconds), the automatic flush device 11 enters programming state 322 at 306. At 1000 (FIGS. 10A and 10B), each of the visual indications associated with each operational mode 409 are cycled through. At 308, an operational mode 409 is selected and an auto-ranging cycle 800 (FIG. 8) is preformed for the new operational mode 409. At 310, the automatic flush device 11 exits the programming state 322 to return to an operational state 320. At 311, the flush valve 10 is actuated to indicate the selection of an operational mode 409.

To illustrate the principles of the present invention, the following non-limiting example of is provided. A user can select the mode by actuating the manual actuation handle 140 (such as by depressing it for a certain period of time), illustrated in FIGS. 1-3, so that the automatic flush device 11 enters a "program state" 322 as indicated by the communication device (e.g., a single flash of the visual indicator 141). Continued actuation of the manual actuation handle 140 will cycle the automatic flush device 11 through its various modes 409. While numerous modes are possible and within the scope of the present invention, one illustrative set of modes 409 is illustrated by FIG. 5.

Figure 5:
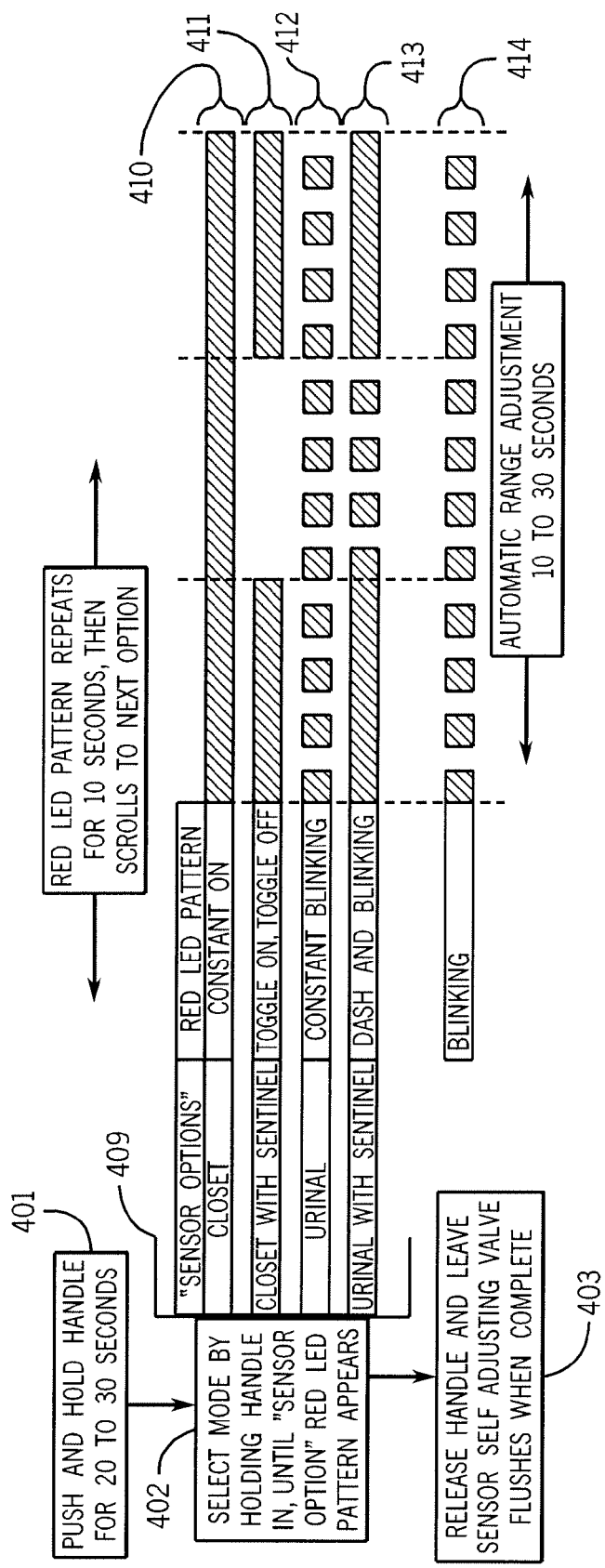
FIG. 5 illustrates one set of visual indicators corresponding to certain operational modes.

In the programming state 322 illustrated in FIG. 5, a user pushes the manual actuation handle 140 and holds it for a period of time (for example 20-30 second) at 401. This cause the automatic flush device 11 to enter the programming state 322 where, at 402, the user is able to select an operational mode 409 for the automatic flush device 11. In one embodiment, during 402, the automatic flush device 11 cycles through the operational modes 409, state indicating the mode 409 via the visual indicator 141. For the embodiment of FIG. 5, the modes 409 are a water closet mode (a solid visual indication 410), a water closet with inactive flush mode (a series of long on-off indications 411), a urinal mode (a series of short on-off indications 412), and a urinal with inactive flush mode (a long on-off period, a short on-off period, and a long-on off period 413). One of ordinary skill in the art will appreciate that the length of time the visual indicator 141 is displayed can be tailored to the specific situation, such as for 20-30 seconds in the embodiment of FIG. 5.

In an exemplary embodiment, following the programming state 322, the automatic flush device 11 enters the auto-ranging mode to adjust the range settings of the presence detector 154, which may be indicated such as in FIG. 5 by a series of short on-off indications 414. In an exemplary embodiment, an audio signal is further provided when the automatic flush device 11 exists the programming state 322, i.e. when operational mode 409 has been selected. Such an audio signal may also include flushing of the automatic flush device 11 a certain number of times depending on the operational mode 409 selected. The use of an audible, as well as visual, signal allows an installer or maintenance individual to move on to the next unit while the prior one is still cycling through automatic ranging process 800, thus reducing the time necessary to setup an array of the automatic flush valve devices 11, such as in a commercial restroom.

In one embodiment, the automatic flush device 11 may be queried regarding its mode of operation 409. For example, where the presence detector 154 detects an object for a certain amount of time, such as but not limited to 8 second to 15 seconds, the communication mechanism then transmits the signal corresponding to the operational mode 409, such as but not limited to a corresponding series of visual indications (for example as illustrated in FIG. 5). Thus, in this embodiment, it is possible to determine the operational mode 409 or other settings of the automatic flush device 11 without entering the programming state 322.

Figure 6:
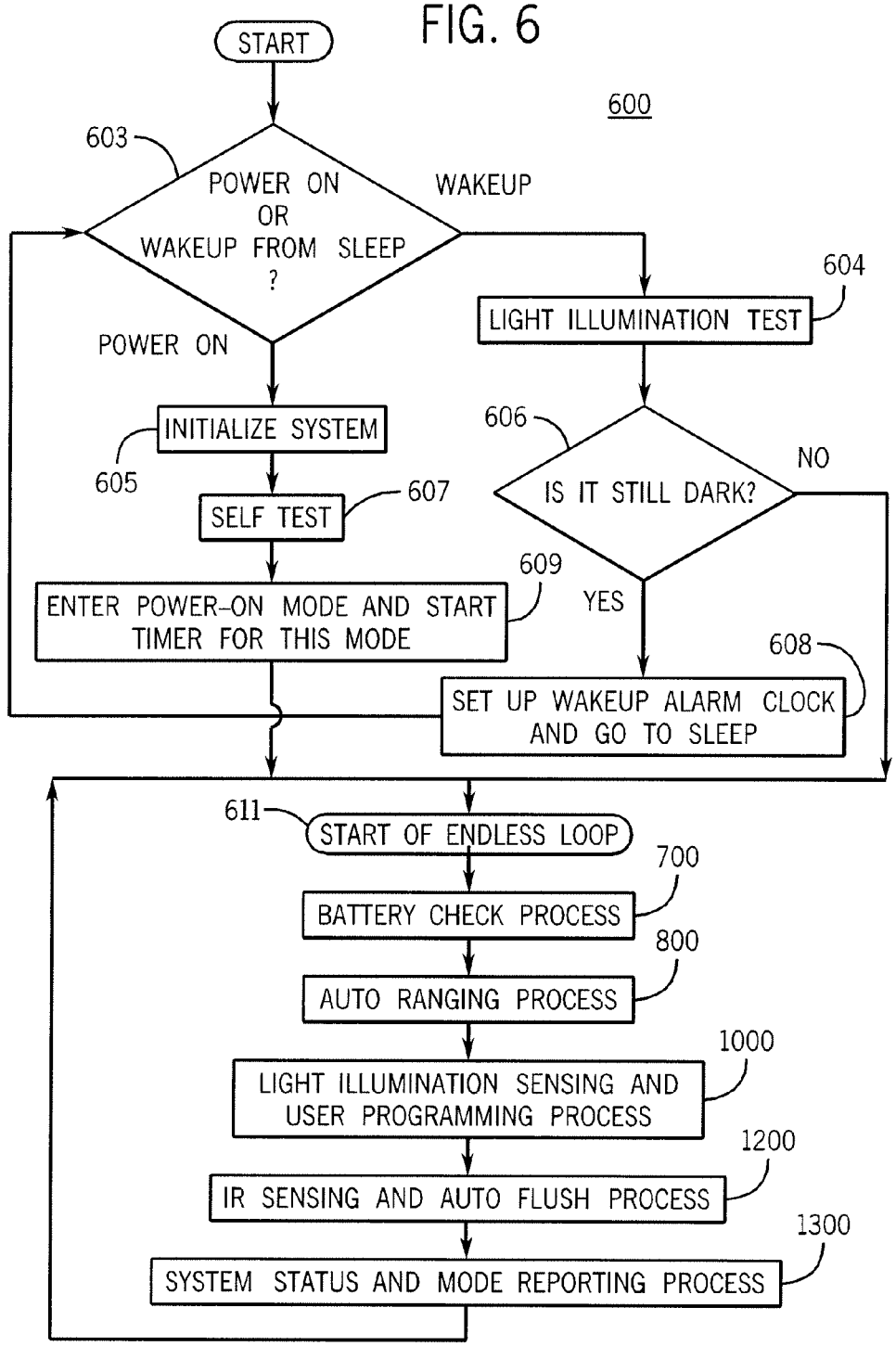
FIG. 6 illustrates a flow chart for one embodiment of a mode of operation of the present invention, with specific subprocesses depicted as flow-charts in FIGS. 7-13.

FIGS. 6-13 illustrate, as a flow chart, the operation of one embodiment of the present invention. FIG. 6 illustrates the overall function of the automatic flush device 11 and FIG. 7-13 illustrate subprocesses performed as part of the overall process. It should be appreciate that the automatic flush device 11 functions in one continuous manner, but the overall processes and subprocesses necessary for that function are depicted as separate flow charts merely for ease of illustration.

FIG. 6 illustrates the master process 600 of the illustrated embodiment. At 603, the automatic flush device 11 is powered on or "wakes-up" from a sleep state 321. If the automatic flush device 11 wakes up from sleep state 321, then an illumination test at 604 is run to determine at 606 if the environment is too dark to indicate potential usage. If the illumination test indicates that the ambient light is below a predetermined threshold, then a wakeup alarm is set at 608, scheduling a later wakeup, and the automatic flush device 11 returns to a sleep state 321 to reenter at 603 at the scheduled wakeup time. If the determination at 606 is that the environment is not too dark, then the automatic flush device 11 moves to an "operational loop" 611.

If the automatic flush device 11 powered on at 603, then the automatic flush device 11 is initialized at 605. The automatic flush device 11 undergoes a self-test at 607. Next the automatic flush device 11 enters a power-on mode and a timer is started (allowing a "time-out" feature to place the automatic flush device 11 in the sleep state 321). The automatic flush device 11 then proceeds to 611, the operational loop.

Figure 13:
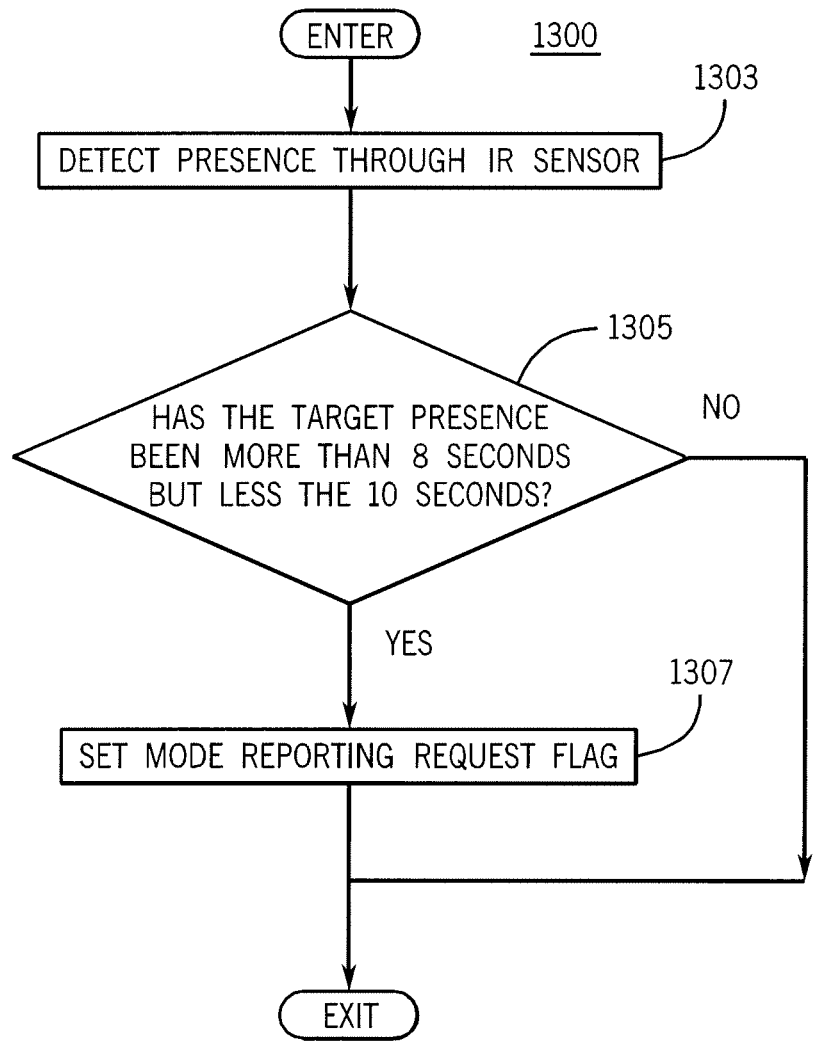
FIG. 13 illustrates a flow chart for one embodiment of a system status and mode reporting process.

The operational loop of 611 consists of a battery check process 700 (FIG. 7), an auto ranging process 800 (FIG. 8), a light illumination sensing and user programming process 1000 (FIGS. 10A and 10B), an IR sensing and auto flush process 1200 (FIG. 12), and a system status and mode reporting process 1300 (FIG. 13).

Figure 7:
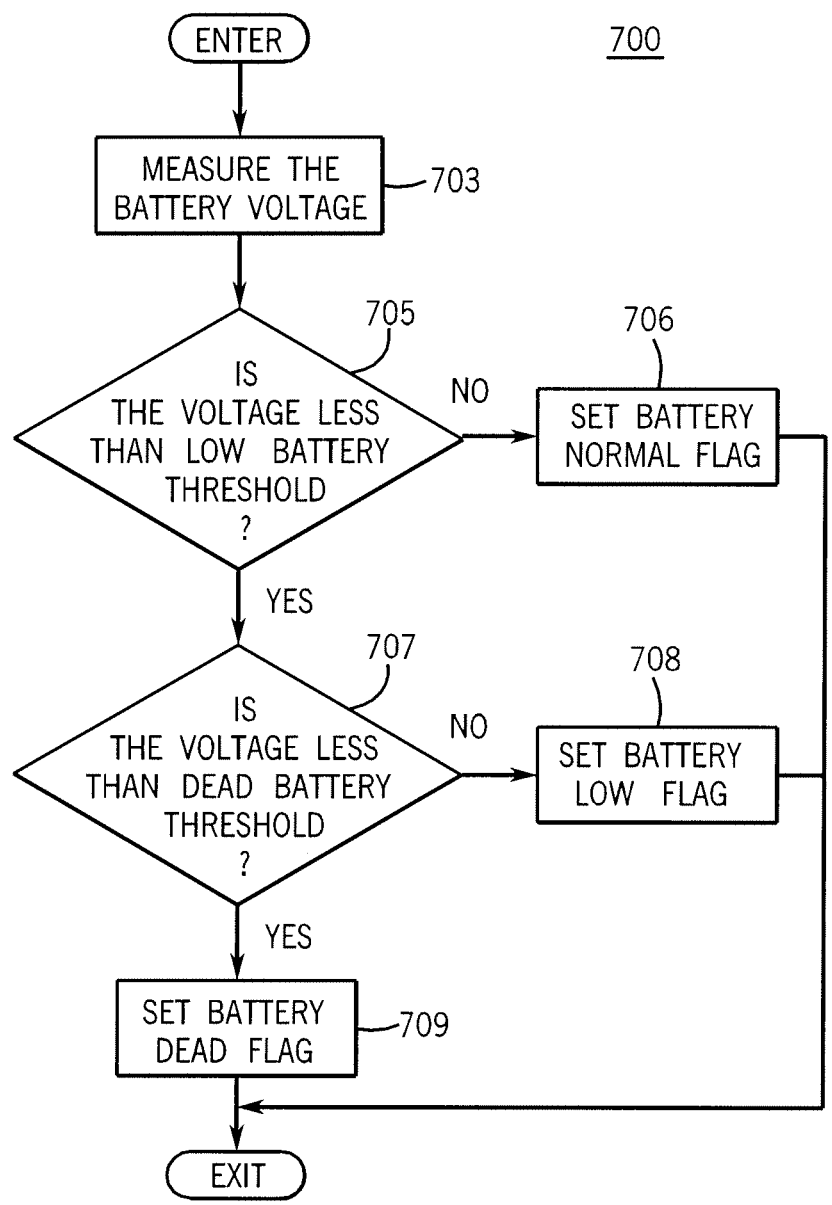
FIG. 7 illustrates a flow chart for one embodiment of a battery check process.

FIG. 7 illustrates the battery check process 700. Upon entering the battery check process 700, the voltage of the battery is measured at 703. A determination is made regarding whether the voltage is less than a predetermined threshold associated with a "low battery". If the voltage measured at 703 is determined at 705 to be above the threshold, then the battery is "tagged" as normal and that tag is stored in the automatic flush automatic flush device 11 device's 11 memory, and the battery check process 700 is exited. If the determination at 705 is that the battery voltage is below the threshold, then another determination is made at 707 to determine if the battery voltage measured at 703 is less than a "dead battery" threshold. If the determination at 707 is no, then the battery is tagged as low, and stored in the memory and the battery check process 700 is exited. If the determination at 707 is that the battery voltage is below the dead battery threshold, then the battery is tagged as dead stored in the memory, and the battery check process 700 is exited.

Figure 8:
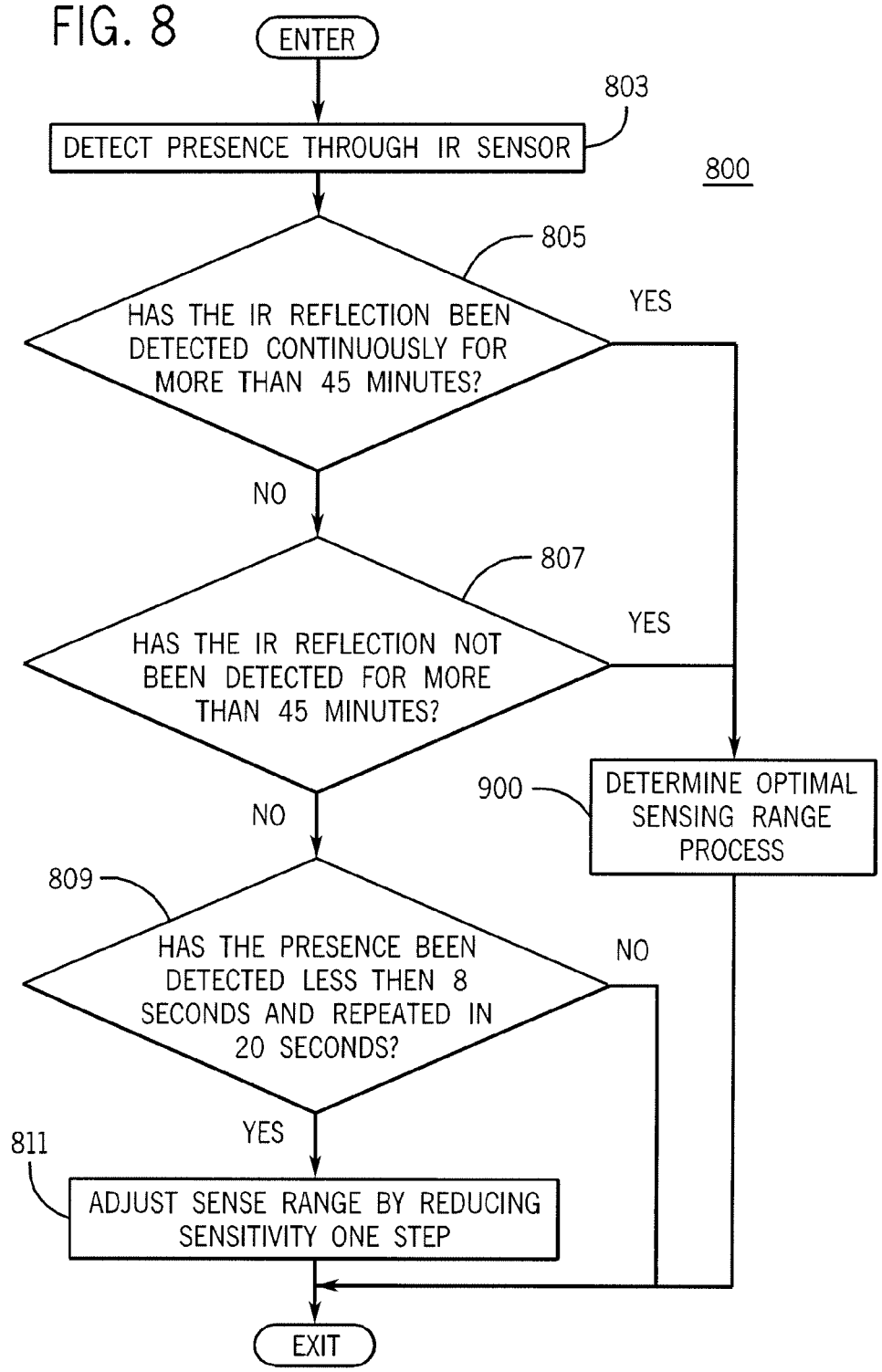
FIG. 8 illustrates a flow chart for one embodiment of an auto ranging process.

As illustrated in FIG. 8, when the auto ranging process 800 is entered, presence detection occurs at 803. A determination is made at 805 as to whether the presence detector 154 has continuously detected presence for more than 45 minutes. If presence has been detected for 45 min, the optimal sensing range process 900 is entered. If the presence has not be detected for 45 min, then another determination is made at 807 regarding whether no presence has been detected for at least 45 min. If the determination of 807 is yes, then the optimal sensing range process 900 is entered. If the determination of 807 is no, then a third determination is made at 809 as to whether the presence has been detected less than 8 seconds and repeated in 20 seconds. If the determination of 809 is yes, then at 811, the sensitivity of the range is reduced one "increment" and the auto ranging process 800 is exited. If determination in 809 is no, then the auto ranging process 800 is exited 850.

Figure 9:
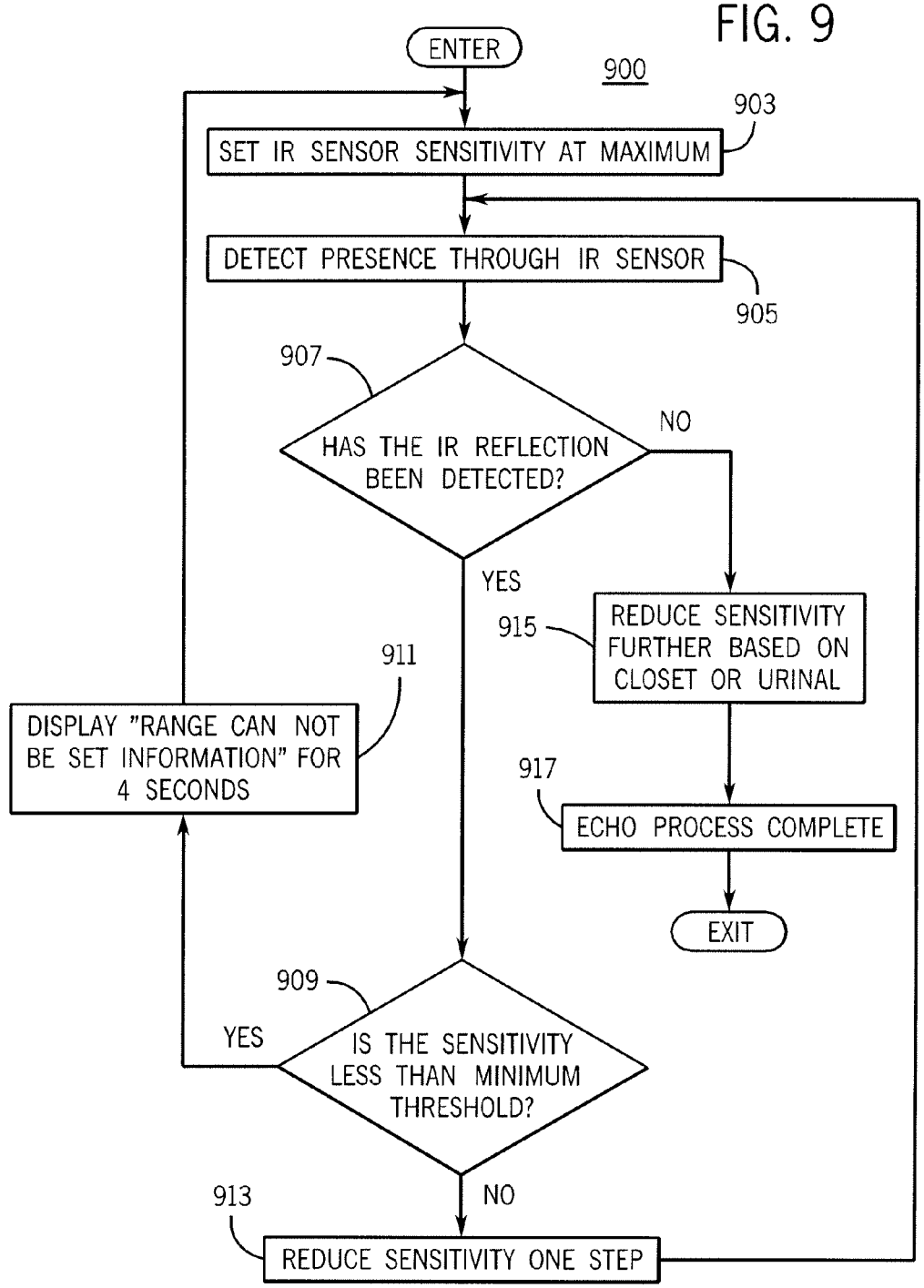
FIG. 9 illustrates a flow chart for one embodiment of an optimal sensing range process.

FIG. 9 illustrates the optimal sensing range process. When auto ranging process 900 is entered, such as described regarding the auto ranging process 800, the IR sensor is set at maximum sensitivity at 903. Next, presence detection occurs at 905. A determination is made at 907 as to whether a presence has been detected. If no, presence is detected, then at 915, sensitivity is reduced. At 917, the process is indicated as complete and the optimal sensing range process 900 is exited 950. If yes, then a determination is made at 909 as to whether sensitivity is less than a minimum threshold. If the determination of 909 is no, then sensitivity is reduced one increment at 913 and the process returns to 905. If the determination of 909 is yes, then an indication, (such as visual) is made that range can not be set 911.

Figure 10A:
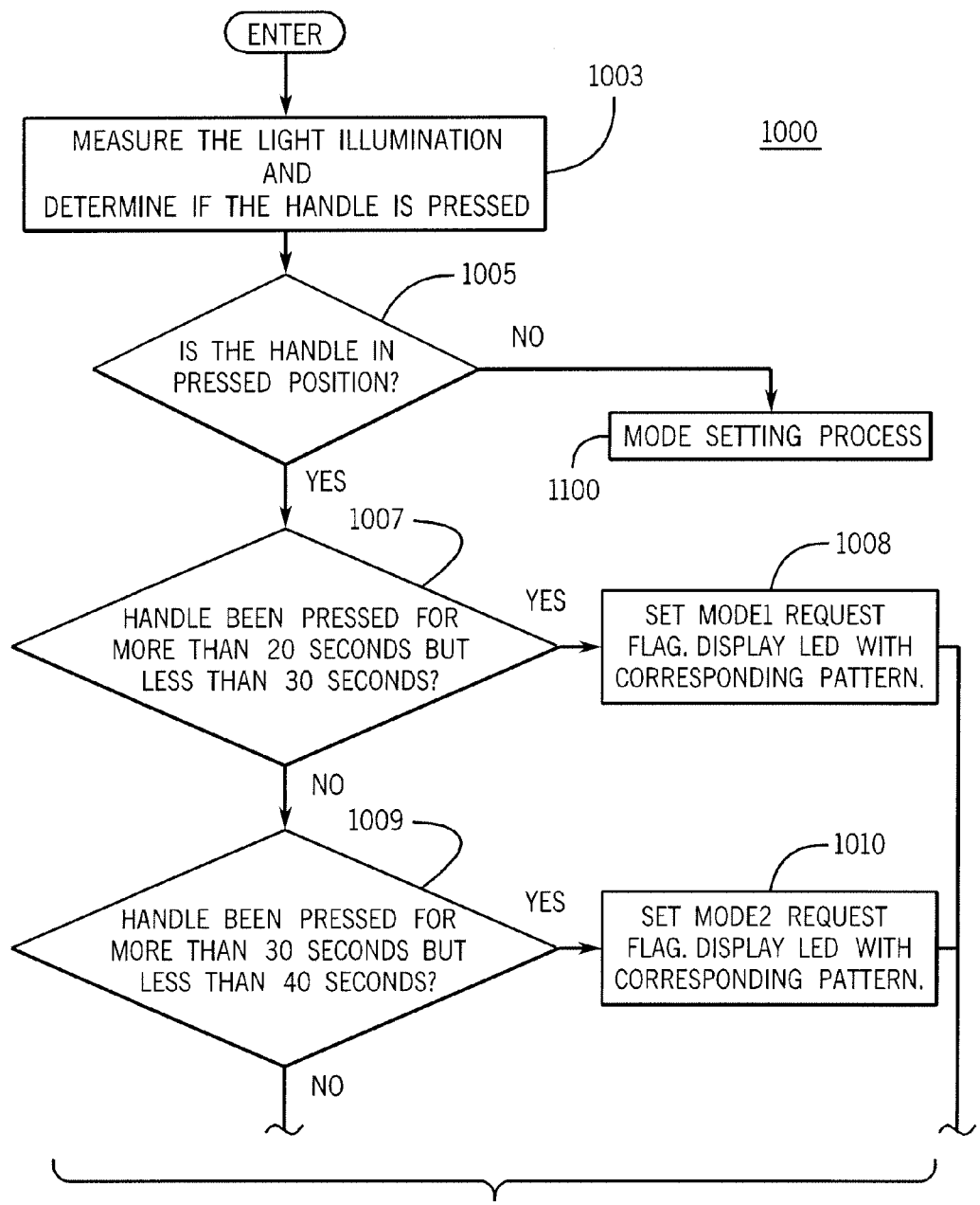

The light illumination sensing and user programming process 1000 of FIGS. 10A and 10B measures the light illumination and determines if the manual actuation handle 140 is pressed at 1003. A determination is made as to whether the handle is in an "actuated" position at 1005. If the handle is determined at 1005 to not be pressed, then a mode setting process 1100 is entered. If the handle is determined to be pressed, then a second determination is made at 1007 regarding whether the handle has been pressed for more than 20 seconds and less than 30 seconds. If yes, then a first mode request tag is set and stored in the automatic flush device's 11 memory at 1008 and a visual display in dictating the operational mode is provided. If the determination of 1007 is no, then a third determination is made at 1009. At 1009, a determination is made as to whether the handle has been pressed for more than 30 but less than 40 second. If yes, then a second mode request tag is set and stored in the system's memory at 1010 and a visual display indicating the mode is provided. If the determination of 1009 is no, then a fourth determination is made at 1016. The determination at 1011 regards whether the handle has been pressed for more than 40 but less than 50 seconds. If yes, then a third mode request tag is set and stored in the automatic flush device's 11 memory at 1012 and a visual display indicating the mode is provided. If the determination of 1011 is no, then a fifth determination is made at 1013. If yes, then a fourth mode request tag is set and stored in the automatic flush device's 11 memory at 1008 and a visual display indicating the mode is provided. If the determination of 1013 is no, then a third determination is made at 1015. At 1015, a determination is made regarding the level of light. If, at 1015, it is determined the environment is too dark, then a wakeup alarm clock is set at 1016 and the process is exited. If the determination is made that it is not too dark at 1015, then the light illumination sensing and user programming process is exited.

FIG. 11 depicts the mode setting process 1100. At 1103, a determination is made as to whether the first mode request tag was set (i.e. stored from 1008). If yes, then the automatic flush device 11 is set as a water closet without the inactive flush mode feature 1104 and the determine optimal sensing range process 900 is entered. If no, then a third determination is made as to whether the third mode request tag was set 1107 at 1012. If yes, then the automatic flush device 11 is set as a urinal without the inactive flush mode 1108 feature and the determine optimal sensing range process 900 is entered. If no, then a fourth determination is made as to whether the fourth mode request tag was set at 1014. If yes, then the automatic flush device 11 is set as a urinal with the inactive flush mode 1110 feature and the determine optimal sensing range process 900 is entered. If no, then the mode setting process 1100 is exited. If any of the mode request tags were set in the light illumination sensing and user programming process 1000, then following the completion of the determine optimal sensing range process 900, a indication is made to the user that programming is complete at 1112.

The flush process 1200 of FIG. 12 begins at 1203 where the motor of the automatic flush device 11 is turned on and the motor is started on a timer. At 1205, the motor load is measured. A determination is made at 1207 regarding whether peak motor load has passed. If it has, then the motor is turned off at 1211 and the flush process 1200 is exited 1250. If the peak load has not been passed, then a second determination is made as to whether the motor has been on more than 5 seconds 1209. If it has, then the motor is turned off at 1211 and the flush process 1200 is exited, if it has not, then the process returns to 1205.

The system status and mode reporting process 1300 is depicted in FIG. 13. At 1303 a presence detection occurs. At 1305, a determination is made as to whether the presence has been detected for more than 8 seconds but less than 10 seconds. If no, then the system status and mode reporting process is exited. If yes, then a mode report request tag is set, stored in the system memory, and a visual indication associated with the particular mode is displayed at 1307.

In addition to the programmability of the automatic flush device 11, the communication mechanism may be utilized to provide various types of information or feedback to a user, installer, or maintenance individual. The communication device may indicate normal operation, such as by a flashing visible light indication upon entry of an object into the sensing range. After the predetermined usage time, an indication is given that the automatic flush device 11 has entered the automatic flush cycle, such as by cessation of the flashing. In addition, when batteries are installed the motor and mechanical activates briefly to determine if the automatic flush device 11 is functional and, if it is, a visual indication may be provided indicating that the automatic flush device 11 is working properly. In a further embodiment, a visual indication conferring diagnostic information may be give in the event the automatic flush device 11 is not functioning properly.

In one embodiment, the visual indicator 141 may be a graphical display, such as, but not limited to an LCD screen. A textual indication can serve as the visual indication of the operational mode. In addition, a graphical or pictorial indication may be used.

In an exemplary embodiment (FIG. 8), the presence detector 154 has an "auto-range process 800" in which the automatic flush device 11 redetermines the optimal range settings. This auto-range process 800 may be manually triggered or set to repeat after a certain time period. In one embodiment, a user may manually trigger the auto-range cycle by providing a certain input via the presence detector 154, such as a by placing an object in the presence sensor's 154 range for a certain period of time. In addition, the manual triggering of the presence detector 154 may reset an auto-ranging timer which controls when the auto-ranging cycle occurs absent a manual indication, or in the alternative have no impact on the auto-ranging. An indication that an object is too close, i.e. within the minimum range or too far, i.e. no object in the sensing field, may be given. FIG. 8 illustrates a flow chart depicting one method for an auto ranging process 800.

In another exemplary embodiment, the communication mechanism is able to display an indication regarding the status of the automatic flush device 11. For example, the automatic flush device 11 may undergo a self-check of certain components such as the motor (not shown) or presence detector 154 and an indication of the results of those self-check can be communicated via the communication mechanism such as by the visual indicator 141.

In an exemplary embodiment having a motor/cam actuation system (not shown), power conservation may be achieved by utilizing the momentum of the cam and motor to complete the rotation necessary to actuate a full flush valve cycle. For example, the roller cam must rotate degrees for a full cycle, but the motor need not actively drive the cam the entire rotation, rather the voltage/load correlation can be monitored to determine when the motor can be shut off and the cam still proceed the entire 180 degrees. In such an embodiment, the power to the motor is controlled by the presence detector 154.

Various embodiments of the present invention have been described as utilizing time ranges. It should be appreciated that while certain embodiments have been described having specific time ranges or patterns of presence detection and/or manual actuation that initiate a process or feature of the automatic flush device 11, any combination of time ranges and patterns providing a unique communication to the automatic flush device 11 are within the scope of the invention. Likewise, certain examples of communication from the automatic flush device 11, such as visual light display patterns or audio indications have been described, but it will be appreciated that a wide range of visual and audio communications are possible within the spirit and scope of the present invention.

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

Embodiments may be described in the general context of method processes which may be implemented by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing the methods disclosed herein. The particular sequence of such executable instructions or associated data structures represent examples of corresponding acts for implementing the functions described in such steps.

An exemplary system for implementing the overall system or various portions thereof may include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for controlling a flush valve device, the method comprising:
   detecting a manual actuation of a handle and beginning a manual actuation timer M; and
   stopping the manual actuation timer M when the handle is released;
   wherein if the manual timer M is less than a predetermined manual flush time $M_f$, then actuating a manual flush and further wherein if the manual timer is greater than a predetermined manual program time Mp, then entering a programming state allowing for selection of an operational mode.

2. The method of claim 1 further comprising:
   detecting a presence and beginning a presence timer, P;
   entering an automatic flush cycle if the presence timer P exceeds a predetermined automatic flush period of time $P_{af}$;
   wherein if the manual actuation is detected during the automatic flush cycle, then aborting the automatic flush cycle and if no manual actuation is detected, then flushing the flush valve device and exiting the automatic flush cycle.

3. The method of claim 2 further comprising selecting the operational mode from a plurality of predetermined operational modes.

4. The method of claim 3 further comprising providing a visual indication of the operational modes of the flush valve device.

5. The method of claim 3 further comprising providing an audio indication of the operational modes when the visual indication is provided.

6. The method of claim 2 further comprising selecting an operational mode of the flush valve device and returning to an operational state.

7. The method of claim 2, further comprising determining ambient light in an environment around the flush valve device.

8. The method of claim 2, wherein the detecting of the manual actuation further comprises determining if a manual flush apparatus of the flush device has been actuated by measuring the change in ambient light.

9. The method of claim 2 further comprising exiting the programming mode and providing a confirmatory indication.

* * * * *